United States Patent [19]

Ninomiya

[11] Patent Number: 5,243,919
[45] Date of Patent: Sep. 14, 1993

[54] MAGNETIC LEVITATION ACTUATOR

[75] Inventor: Masami Ninomiya, Tokyo, Japan

[73] Assignee: Asahi Kogaku Kogyo Kabushiki Kaisha, Tokyo, Japan

[21] Appl. No.: 711,977

[22] Filed: Jun. 7, 1991

[30] Foreign Application Priority Data

Jun. 8, 1990 [JP] Japan ................ 2-61108[U]
Jun. 13, 1990 [JP] Japan ................ 2-156542

[51] Int. Cl.$^5$ ............................................. G11B 7/00
[52] U.S. Cl. ...................................... 104/281; 104/283; 104/291; 104/294; 369/215
[58] Field of Search ............... 104/281, 282, 283, 286, 104/292, 291, 294; 369/219, 215, 220

[56] References Cited

U.S. PATENT DOCUMENTS

| | | | |
|---|---|---|---|
| 4,185,836 | 1/1980 | Taylor et al. | 369/220 |
| 4,570,249 | 2/1986 | Malissin et al. | 369/219 |
| 4,704,712 | 11/1987 | Siryi | 369/219 |
| 5,050,157 | 9/1991 | Miura et al. | 369/215 |
| 5,121,016 | 6/1992 | Wachi | 369/215 |

FOREIGN PATENT DOCUMENTS 2146141 3/1973 Fed. Rep. of Germany ...... 104/281
0224807 10/1986 Japan .................................. 104/281

Primary Examiner—Mark T. Le
Attorney, Agent, or Firm—Sandler Greenblum & Bernstein

[57] ABSTRACT

A magnetic levitation actuator includes a pair of U-shaped first permanent magnets provided on opposite sides of an object to be driven with a pair of outwardly projecting first legs defining the U-shape. A pair of guide rails are spaced apart from the object on opposite sides thereof, and a pair of U-shaped second permanent magnets are provided on associated guide rails and extend along the guide rails. Each of the second permanent magnets is provided with a second pair of legs defining the U-shape of the associated second magnets and opposed to the associated first legs of the first magnets with a predetermined gap therebetween. The first legs and second legs, which are opposed to each other, have opposite polarities to produce a magnetic attraction therebetween.

37 Claims, 5 Drawing Sheets

MAGNETIC LEVITATION ACTUATOR

BACKGROUND OF THE INVENTION

1. Field of the Invention

The present invention relates to a magnetic levitation actuator which levitates and supports an object to be driven, such as an optical head and also relates to a magnetic actuator which linearly moves the optical head.

2. Description of Related Art

In known optical disc devices such as, for example, a laser disc device, a compact disc device, or an optical recording and reproducing system, an optical head for recording and/or reproducing data is moved in a radial direction of an optical disc (circular disc-like recording medium) by a drive mechanism. As is well known, the optical head emits a recording or reproducing laser beam, so that upon recording, an array of small record (signal) holes are formed on the recording medium (optical disc), and upon reproducing, the recorded data is read, based on light reflected from the signal hole array. The optical head is usually supported by a magnetic levitation actuator.

The magnetic levitation actuator is theoretically comprised of a pair of magnetic attraction circuits (or magnetic repellent circuits) positioned between guide rails which extend in the radial direction of the optical disc and the optical head. The optical head is levitated in the air in a non-contact state due to a balanced magnetic attractive or repellent force of the magnetic attraction circuits (or the magnetic repellent circuits). However, in the known magnetic levitation actuator the magnetic attractive or repellent force is small so that the supporting force of the optical head is insufficient to resist an external turbulence, such as vibration or the like. Consequently, the optical head may fall.

Furthermore, it is necessary to provide a tracking device in order to move the optical head in the radial direction of the optical disc. However, a known tracking device, usually comprised of a magnetic driving device, is provided separately from the magnetic levitation actuator for levitating and supporting the optical head as mentioned above. This is one obstacle in the realization of a small apparatus.

SUMMARY OF THE INVENTION

The primary object of the present invention is to provide a magnetic levitation actuator which can levitate an object to be driven with a strong magnetic force and which is highly resistable to external turbulence, such as vibration or the like.

Another object of the present invention is to provide a linear drive mechanism of an object to be driven in which a part of the magnetic levitation actuator is employed.

Still another object of the present invention is to provide a magnetic levitation actuator which can drive the object to be driven at high speed.

To achieve the object mentioned above, according to the present invention, there is provided a magnetic levitation actuator comprising a pair of generally angular U-shaped first magnetic bodies provided on opposite sides of the object to be driven, each of the first magnetic bodies being provided with a pair of outwardly projecting first legs defining the angular U-shaped body, a pair of guide rails spaced apart from the object to be driven on opposite sides thereof, and a pair of generally angular U-shaped second magnetic bodies provided on the associated guide rails extending along the guide rails, each of the second magnetic bodies being provided with a pair of second legs defining the angular U-shaped second magnetic bodies which are opposed to the associated first legs of the first magnetic bodies with a predetermined gap therebetween. The first legs and second legs which are opposed to each other have opposite polarities to produce a magnetic attraction therebetween.

The present disclosure relates to subject matter contained in Japanese utility model application No. HIE 2-61108 (filed on Jun. 8, 1990) and Japanese patent application No. HEI 2-156542 (filed on Jun. 13, 1990).

BRIEF DESCRIPTION OF THE DRAWINGS

The invention will be described below in detail with reference to the accompanying drawings, in which.

DESCRIPTION OF THE PREFERRED EMBODIMENTS

Figure 1:
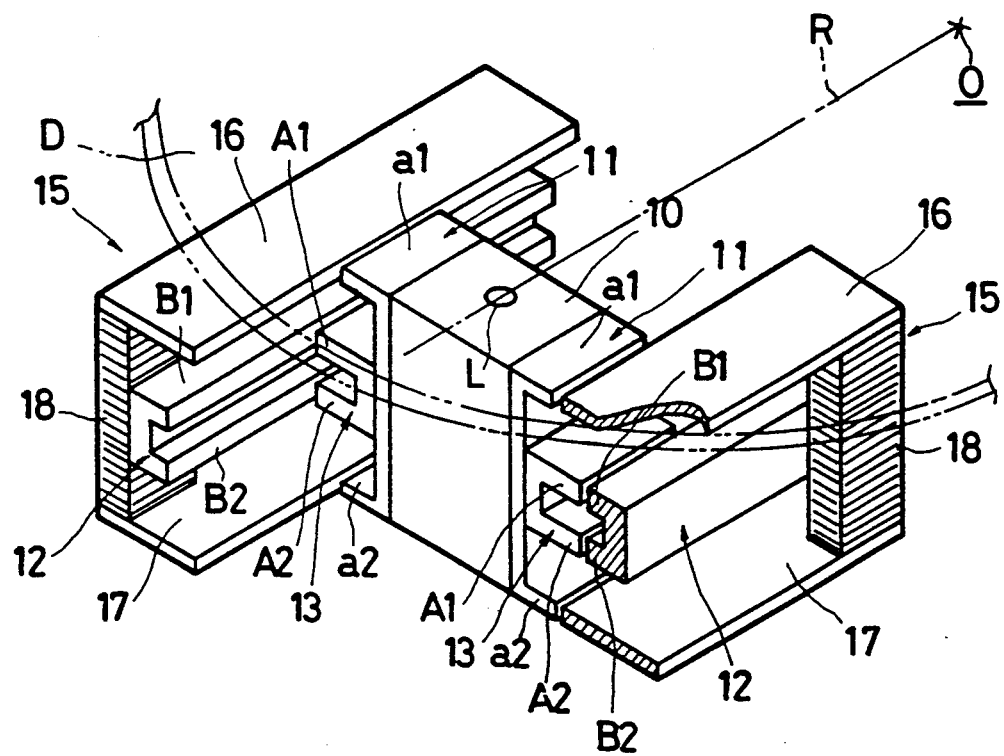
FIG. 1 is a partially broken perspective view of a magnetic levitation actuator according to an aspect of the present invention.
Figure 2:
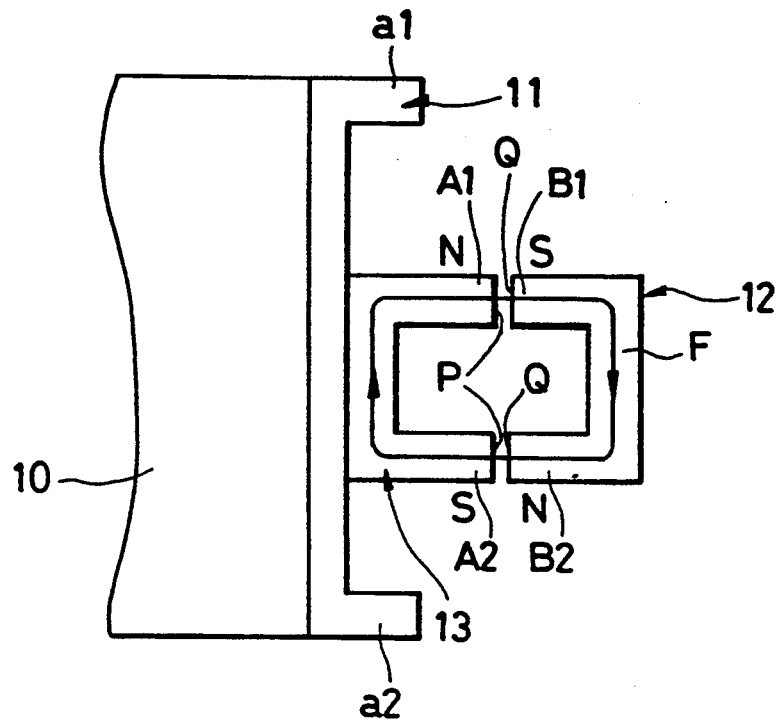
FIG. 2 is a front elevation view of a pair of opposed permanent magnets shown in FIG. 1 and the surroundings thereof.
Figure 3:
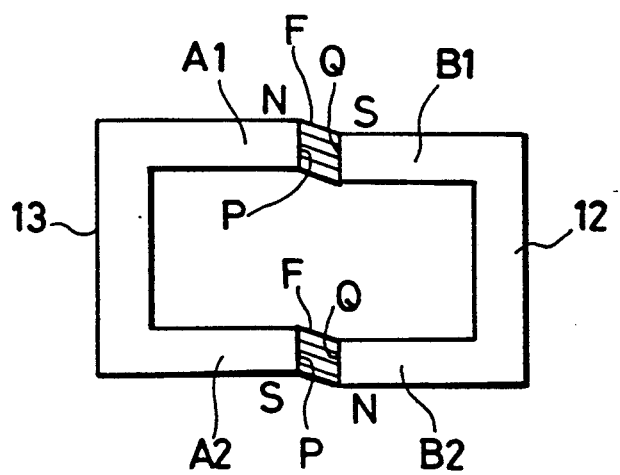
FIG. 3 is an explanatory view of a magnetic flux produced by a pair of permanent magnets, shown in FIG. 2, which are vertically displaced.

FIGS. 1 through 3 show a first embodiment of a magnetic levitation actuator which levitates and supports an optical head as an object to be driven, according to the present invention.

An optical head (unit) 10, as an example of an object to be driven, has a condenser lens L which emits a laser beam. The optical head 10 is provided with a focusing device (not shown) for correctly converging a laser beam with condenser lens L onto a recording surface of an optical disc D. A precise tracking device (not shown) makes the laser beam coincidental with the signal hole array of the recording surface of the optical disc. Since the subject of the present invention is not directly addressed to the internal construction of the optical head, including the focusing device and the precise tracking device, no detailed explanation therefor is given herein.

The optical disc D is rotated about a rotation center O. An optical head 10 is provided between a pair of guide rails 15 which extend in parallel with a radial direction R of the optical disc D. The magnetic levitation actuator according to the present invention is line-symmetrical with respect to the radial direction R of the optical disc D. Accordingly, the following discussion will be mainly directed to a right or left half thereof.

The optical head 10 has a pair of angular U-shaped right and left yokes 11 made of magnetic material. Each yoke 11 has an open side that faces outward, to which a U-shaped permanent magnet 13 is secured thereto. The permanent magnets 13 open outward. Namely, each permanent magnet 13 has a pair of legs A1 and A2 which extend toward the associated guide rails 15. The legs A1 and A2 project further towards the guide rail 15 than do associated legs a1 and a2 of the yoke 11.

Each of the guide rails 15 has yokes 16 and 17, made of a magnetic material, opposed to the legs a1 and a2 of the associated yoke 11 with a predetermined gap therebetween and connected to each other through a coil 18 on an iron core. Consequently, when the coils 18 are energized, a magnetic flux is produced in the yokes 16 and 17 and the yoke 11 to generate a magnetic attraction which can be adjusted by varying the quantity of electric current supplied to the coils 18 with the incorporated iron cores.

In the guide rails 15 are immovably provided angular U-shaped permanent magnets 12 which have legs B1 and B2 opposed to legs A1 and A2 of the corresponding permanent magnets 13 with a small gap therebetween. Legs A1 and B2 have the same polarity. Legs A2 and B1 have the same polarity opposite to that of legs A1 and B2. Namely, the opposed legs A1 and B1 have opposite polarities and the opposed legs A2 and B2 have opposite polarities, so that the opposed legs A1 and B1) and the opposed legs A2 and B2 are magnetically attracted to each other.

Permanent magnets 12 and 13 can be made of ferrite or rare-earth material as usual. In the present embodiment, the permanent magnets 12 and 13 are further made of magnetically anisotropic material, so that the magnetic flux leaking from portions thereof other than the opposed end faces P and Q (FIG. 2) will be as small as possible. The magnetic anisotropy can be realized, for example, by a plastic magnet. Although the magnetically anisotropical permanent magnets can be made of a material other than plastic, the latter makes it possible to easily shape the magnet.

The term "magnetic anisotropy" referred to above describes the characteristics of a permanent magnet which has been manufactured inside a magnetic field. The resulting magnet has a magnetization in the same direction as the magnetic field in which it was created. Accordingly, the incoming and outgoing paths of the magnetic line of force is restricted.

The plastic magnet can be made, for example, of powdered permanent magnet material mixed with powdered plastic material in a known injection molding process.

The permanent magnet in the present invention can be replaced with any magnetic body having an anisotropy.

In the magnetic levitation actuator as constructed above, since opposed legs A1 and B1 and opposed legs A2 and B2 of the opposed permanent magnets 12 and 13 have opposite (positive and negative) polarities, as mentioned above, a closed magnetic circuit is formed therebetween. Consequently, magnetic flux F flows in the permanent magnets 12 and 13 in such a way that no leakage of the magnetic flux into the yoke 11 takes place. Namely, even if the permanent magnets 13 are directly and closely adhered to the yokes 11, no magnetic flux leaks from the permanent magnets 13 into the yokes 11. This results in an increased magnetic flux density between the permanent magnets 12 and 13 to provide an enhanced magnetic attraction.

Furthermore, according to the present invention, the permanent magnets 12 and 13 are provided on opposite sides of the optical head 10 so as to have a balanced magnetic attraction. The optical head 10 can be stably levitated and supported in a non-contact state by controlling the quantity of electrical current supplied to the coils 18 with the incorporated iron cores. The magnetic attractive force in the right and left directions can also be controlled by controlling the quantity of electrical current supplied to the coils 18.

If the optical head 10 oscillates, such that the opposed permanent magnets 12 and 13 are vertically offset or deviated from one another, as shown in FIG. 3, since no magnetic flux F leaks from the portions other than the opposed end faces P and Q of the anisotropic permanent magnets 12 and 13, a restoration force, depending on the deviation, acts on the opposed permanent magnets 12 and 13. Consequently, even if the optical head 10 receives an external turbulence, there is little possibility that the optical head 10 falls from the right and left guide rails 15.

Figure 4:
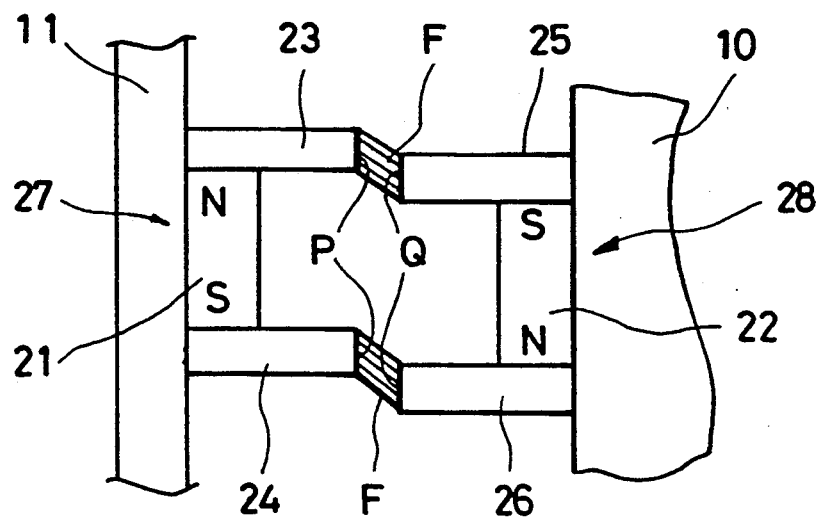
FIG. 4 is an explanatory view of a magnetic flux produced by a pair of permanent magnets, corresponding to FIG. 3, according to another aspect of the present invention.
Figure 5:
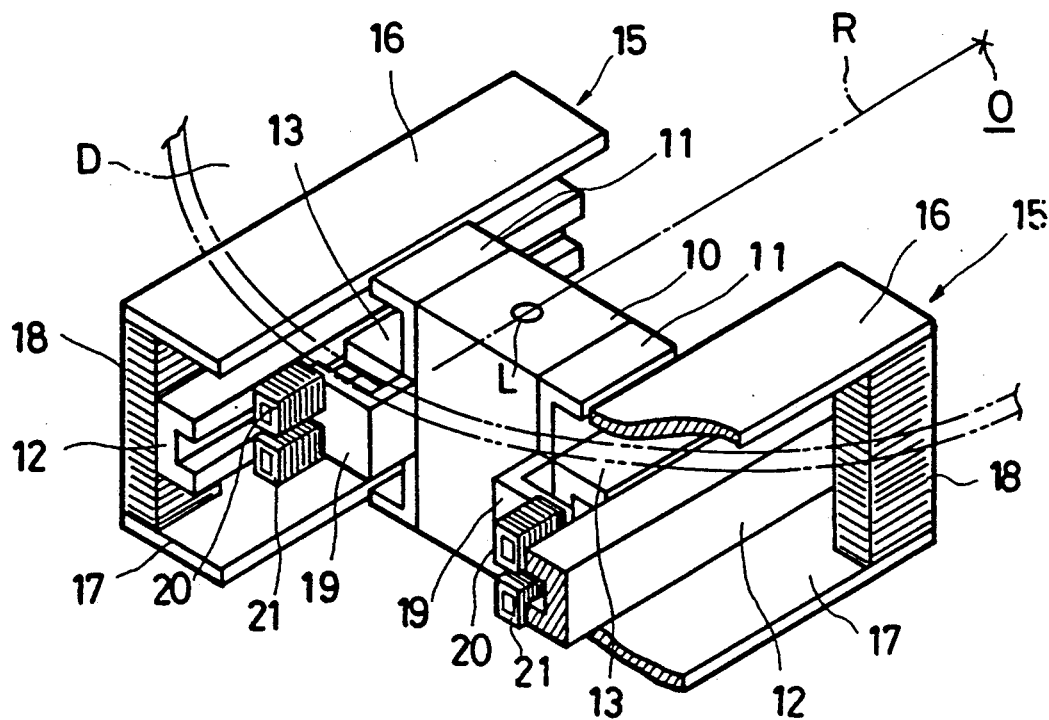
FIG. 5 is a partially broken perspective view of a magnetic levitation actuator in which a magnetic linear drive mechanism is additionally provided, in comparison with the magnetic levitation actuator shown in FIG. 1.
Figure 6:
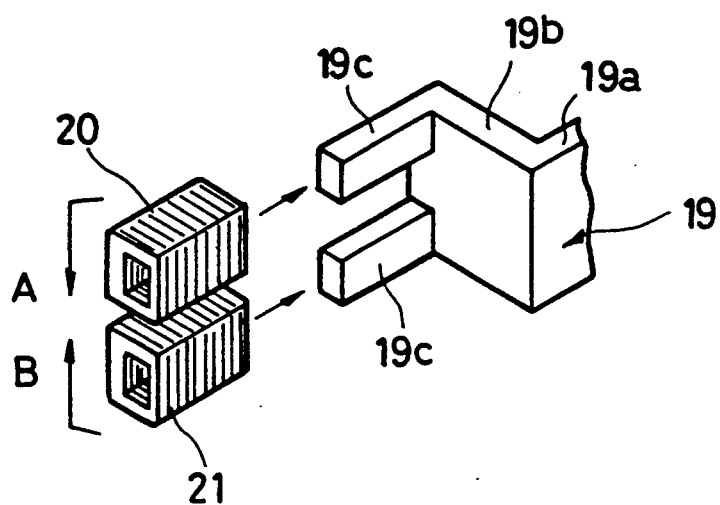
FIG. 6 is an exploded perspective view of a yoke and voice coils on the optical head side, shown in FIG. 5.

FIG. 4 shows a modified embodiment of the present invention. In this embodiment, the angular U-shaped permanent magnets 12 and 13 of the first embodiment illustrated in FIGS. 1 through 3 are replaced with permanent magnets 27 and 28. The permanent magnets 27 and 28 are comprised of rod-like permanent magnets 21 and 22 and plate-like yokes 23, 24 and 25, 26 of magnetic material which are connected to the opposite ends of the permanent magnets 21 and 22, respectively.

In the modified embodiment illustrated in FIG. 4, the yokes 23 through 26 are preferably made of material which produces the magnetic flux F mainly at the opposed end faces P and Q thereof and prevents the magnetic flux from leaking from portions other than the end faces P and Q, similar to the first embodiment.

FIGS. 5 through 9 show another embodiment of the present invention, in which a linear drive mechanism (tracking device) is additionally provided in the magnetic levitation actuator, as shown in FIG. 1, to linearly move the optical head 10 in the radial direction R.

The elements of the embodiment illustrated in FIGS. 5 through 9 corresponding to those in the above-mentioned first embodiment are designated with the same reference numerals as those in the first embodiment.

In this embodiment, the optical head 10 has moving yokes 19 which attract the magnetic flux of the permanent magnets 12 on the guide rails 15 to form closed magnetic circuits. The moving yokes 19 are provided with legs 19c with wound voice coils 20 and 21, so that the voice coils 20 and 21 can be supplied with electric current so as to linearly move the optical head 10.

The moving yokes 19 are made integral with the yokes 11 provided on the right and left sides of the optical head 10 and are projected therefrom in the radial direction R of the optical disc D. The moving yokes 19 have radially extending portions 19a extending in a direction parallel to the length of the permanent magnets 12. The moving yokes 19 also have connecting portions 19b that extend from the front ends of the radially extending portions 19a towards the associated permanent magnets 12, and a pair of legs 19c, mentioned above, which extends from the front ends of the connecting portions 19b to be in close proximity and parallel with legs B1 and B2 of the permanent magnets 12. The winding directions of the voice coils 20 and 21 of legs 19c of the moving yokes 19 are opposite each other, as designated with arrows A and B in FIG. 6.

In the second embodiment, the levitation support mechanism of the optical head 10 between the guide rails 15 is similar to that of the first embodiment illustrated in FIG. 1. The following is directed to the linear driving mechanism of the optical head 10.

Figure 9:
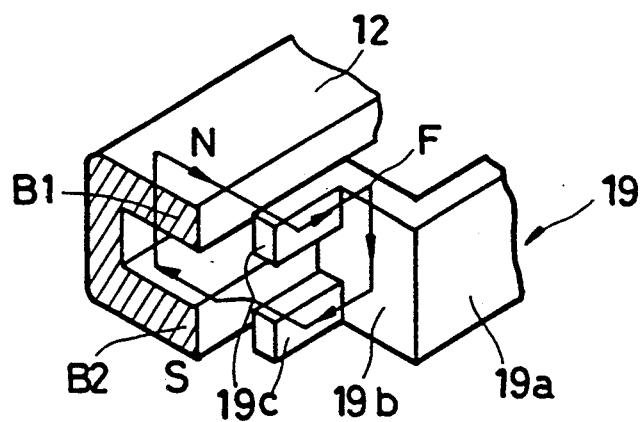
Figure 7:
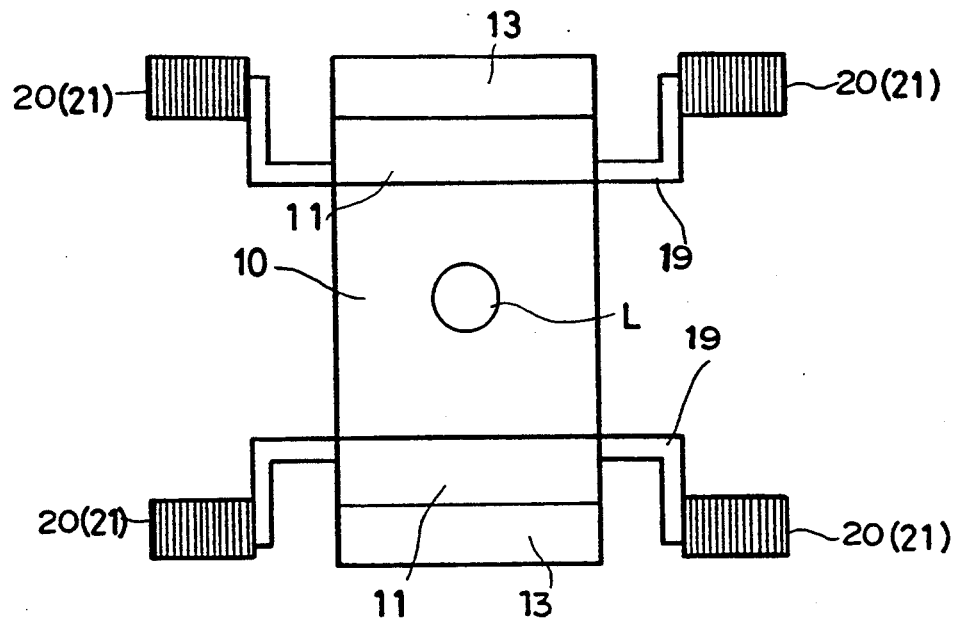
FIG. 7 is a plan view of the optical head shown in FIG. 5.
Figure 8:
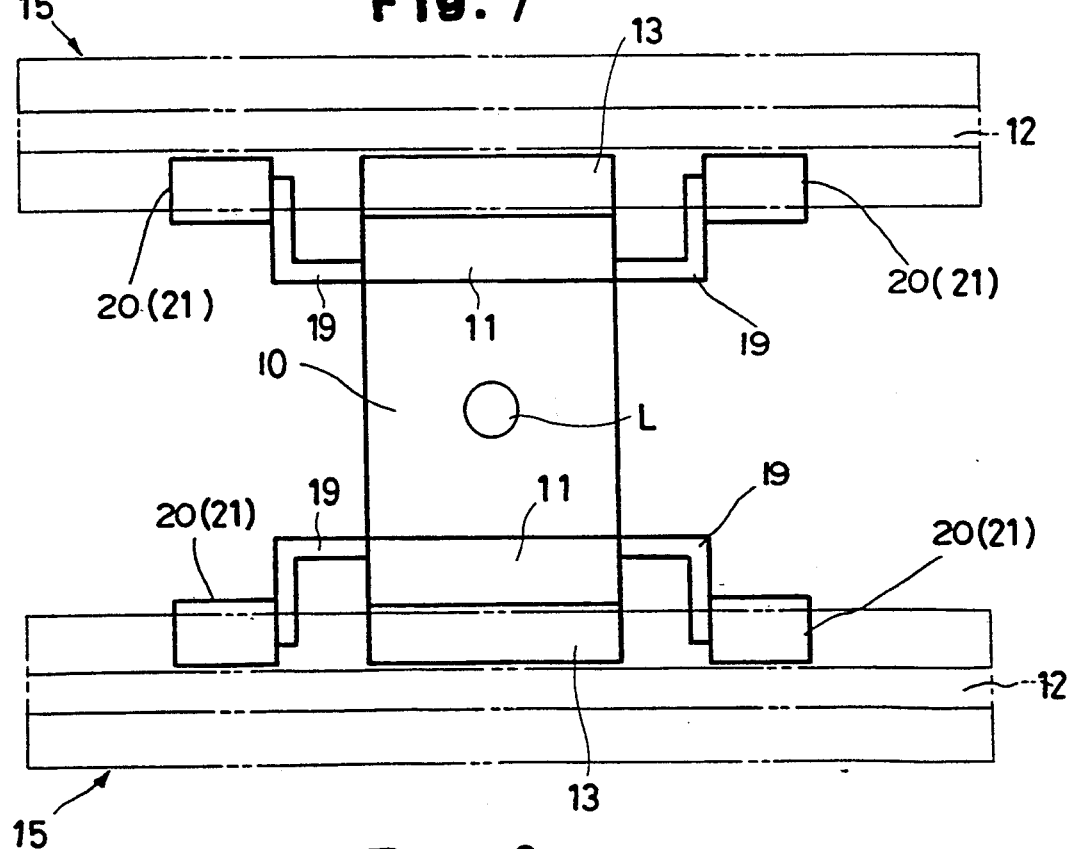
FIG. 8 is a plan view of the optical head and guide rails, shown in FIG. 5; and, FIG. 9 is an explanatory view of a magnetic flux produced between the yoke on the optical head side and a permanent magnet on the guide rail side shown in FIG. 5.

The magnetic flux F flows between legs B1 and B2 of the permanent magnet 12 and the legs 19c of moving yoke 19 due to the magnetic force of the permanent magnet 12 on the guide rail 15, as shown in FIG. 9, so that a closed magnet circuit is formed therebetween. The voice coils 20 and 21 coiled on the legs 19c of the moving yokes 19 are positioned across the associated magnetic fluxes F of the magnetic circuits so that when the voice coils 20 and 21 are activated, the force to move the optical head 10 in the radial direction R is produced. Since the winding directions of the voice coils 20 and 21 are different from each other, as mentioned above, the direction and speed of the optical head 10 depends on the power supply electrical current of the voice coil 20 or 21 and the value of the electrical current. Alternatively, the winding directions of the voice coils 20 and 21 can be identical to each other. In this alternative, it is necessary to control the directions of electric current flow to be supplied to the voice coils 20 and 21 in accordance with the winding directions of the voice coils.

As can be seen from the above discussion, according to the embodiment illustrated in FIGS. 5 through 9, the linear drive mechanism which drives optical head 10 can comprise permanent magnets 12 provided on the guide rails 15 to levitate and support the optical head 10. Thus, a simple and small magnetic levitation actuator with or without a linear drive mechanism can be easily realized.

I claim:

1. A magnetic levitation actuator, comprising:
    an object to be driven, said object comprising an optical head which moves in a radial direction of an optical disc;
    a pair of first magnetic bodies having a generally U-shaped cross section provided on opposite sides of said object to be driven, each of said first magnetic bodies being provided with a pair of outwardly projecting first legs defining said U-shaped cross section;
    a pair of guide rails spaced apart from said object to be driven on opposite sides thereof; and
    a pair of second magnetic bodies having a generally U-shaped cross section provided on said guide rails and extending along said guide rails, each of said second magnetic bodies being provided with a pair of second legs defining said U-shaped cross section of said second magnetic bodies and opposed to said first legs of said first magnetic bodies with a predetermined gap therebetween,
    said first legs and second legs which are opposed to each other having opposite polarities so as to produce a magnetic attraction therebetween.

2. A magnetic levitation actuator according to claim 1, wherein each of said first magnetic bodies comprises a permanent magnet.

3. A magnetic levitation actuator according to claim 2, wherein each of said second magnetic bodies comprises a permanent magnet.

4. A magnetic levitation actuator according to claim 3, further comprising first yokes provided on opposite sides of said object to be driven.

5. A magnetic levitation actuator according to claim 4, further comprising moving yokes provided on said first yokes and extending along said guide rails.

6. A magnetic levitation actuator according to claim 5, wherein each of said moving yokes has a pair of legs which are provided with voice coils wound thereon and which are opposed to said legs of said second permanent magnets.

7. A magnetic levitation actuator according to claim 6, wherein said voice coils of each moving yoke have different winding directions.

8. A magnetic levitation actuator according to claim 4, wherein each of said first yokes has a generally U-shaped cross section.

9. A magnetic levitation actuator according to claim 8, wherein each of said first yokes has a pair of outwardly projecting legs which define said U-shaped cross section.

10. A magnetic levitation actuator according to claim 9, wherein said first permanent magnets are directly connected to said first yokes.

11. A magnetic levitation actuator according to claim 10, wherein each of said guide rails comprises an electromagnet having a pair of second yokes corresponding to said legs of one of said first yokes and a coil connecting said pair of second yokes.

12. A magnetic levitation actuator according to claim 11, wherein said first permanent magnets have an anisotropy, so that a magnetic flux passes between opposite end faces of opposed legs thereof.

13. A magnetic levitation actuator according to claim 12, wherein said second permanent magnets have an anisotropy, so that said magnetic flux mainly passes between said end faces of said opposed legs thereof.

14. A magnetic levitation actuator according to claim 13, wherein said second permanent magnets comprise plastic magnets.

15. A magnetic levitation actuator according to claim 12, wherein said first permanent magnets comprise plastic magnets.

16. A magnetic levitation actuator according to claim 1, wherein each of said guide rails extends parallel to a radial direction of the optical disc.

17. A magnetic actuator, comprising:
    an object to be driven;
    a pair of guide rails spaced apart from said object to be driven on opposite sides thereof;
    a pair of permanent magnets secured to and extending along said guide rails;
    a pair of yokes provided on opposite sides of said object to be driven and having coil mounting legs extending along said pair of permanent magnets; and
    voice coils mounted to said coil mounting legs of said pair of yokes,
    each of said permanent magnets secured to said guide rails having a generally U-shaped cross section and being provided with a pair of inwardly projecting legs which defines said U-shaped cross section.

18. A magnetic actuator according to claim 17, wherein said voice coils of said coil mounting legs of each yoke are wound in different directions.

19. A magnetic actuator according to claim 18, further comprising permanent magnets provided on opposite sides of said object to be driven and opposed to said permanent magnets of the guide rails with a predetermined gap therebetween so as to attract each other.

20. A magnetic actuator according to claim 18, wherein each of said permanent magnets provided on opposite sides of said object to be driven and on said guide rails has a generally U-shaped cross section and has opposed legs which define said generally U-shape.

21. A magnetic actuator according to claim 17, wherein said object to be driven comprises an optical head which moves in a radial direction of an optical disc.

22. A magnetic actuator according to claim 21, wherein each of said guide rails extends parallel to said radial direction of said optical disc.

23. A magnetic levitation actuator, comprising:
an object to be driven;
a pair of first magnetic bodies having a generally U-shaped cross section provided on opposite sides of said object to be driven, each of said first magnetic bodies comprising a permanent magnet and a pair of outwardly projecting first legs defining said U-shaped cross section;
a pair of guide rails spaced apart from said object to be driven on opposite sides thereof; and
a pair of second magnetic bodies having a generally U-shaped cross section provided on said guide rails and extending along said guide rials, each of said second magnetic bodies comprising a permanent magnetic and a pair of second legs defining said U-shape cross section of said second magnetic bodies and opposed to said first legs of said first magnetic bodies with a predetermined gap therebetween,
said first legs and second legs which are opposed to each other having opposite polarities so as to produce a magnetic attraction therebetween.

24. A magnetic levitation actuator according to claim 23, further comprising first yokes provided on opposite sides of said object to be driven.

25. A magnetic levitation actuator according to claim 24, further comprising moving yokes provided on said first yokes and extending along said guide rails.

26. A magnetic levitation actuator according to claim 25, wherein each of said moving yokes has a pair of legs which are provided with voice coils wound thereon and which are opposed to said legs of said second permanent magnets.

27. A magnetic levitation actuator according to claim 26, wherein said voice coils of each moving yoke having different winding directions.

28. A magnetic levitation actuator according to claim 24, wherein each of said first yokes has a generally U-shaped cross section.

29. A magnetic levitation actuator according to claim 28, wherein each of said first yokes has a pair of outwardly projecting legs which define said U-shaped cross section.

30. A magnetic levitation actuator according to claim 29, wherein said first permanent magnets are directly connected to said first yokes.

31. A magnetic levitation actuator according to claim 30, wherein each of said guide rails comprises an electromagnet having a pair of second yokes corresponding to said legs of one of said first yokes and a coil connecting said pair of second yokes.

32. A magnetic levitation actuator according to claim 31, wherein said first permanent magnets have an anisotropy, so that a magnetic flux passes between opposite end faces of opposed legs thereof.

33. A magnetic levitation actuator according to claim 32, wherein said second permanent magnets have an anisotropy, so that said magnetic flux mainly passes between said end faces of said opposed legs thereof.

34. A magnetic levitation actuator according to claim 33, wherein said second permanent magnets comprise plastic magnets.

35. A magnetic levitation actuator according to claim 32, wherein said first permanent magnets comprise plastic magnets.

36. A magnetic levitation actuator according to claim 23, wherein said object to be driven comprises an optical head which moves in a radial direction of an optical disc.

37. A magnetic levitation actuator according to claim 23, wherein each of said guide rails extends parallel to a radial direction of an optical disc.

* * * * *

UNITED STATES PATENT AND TRADEMARK OFFICE
CERTIFICATE OF CORRECTION

PATENT NO. : 5,243,919
DATED : September 14, 1993
INVENTOR(S) : M. NINOMIYA

It is certified that error appears in the above-indentified patent and that said Letters Patent is hereby corrected as shown below:

At column 7, line 7 (claim 19, line 4) of the printed patent, change of the" to ---of said---.

Signed and Sealed this

First Day of November, 1994

Attest:

BRUCE LEHMAN

Attesting Officer  Commissioner of Patents and Trademarks